D. C. WILLIAMS.
MOTOR VEHICLE STEERING GEAR.
APPLICATION FILED APR. 16, 1920.
1,366,991.
Patented Feb. 1, 1921.
2 SHEETS—SHEET 2.
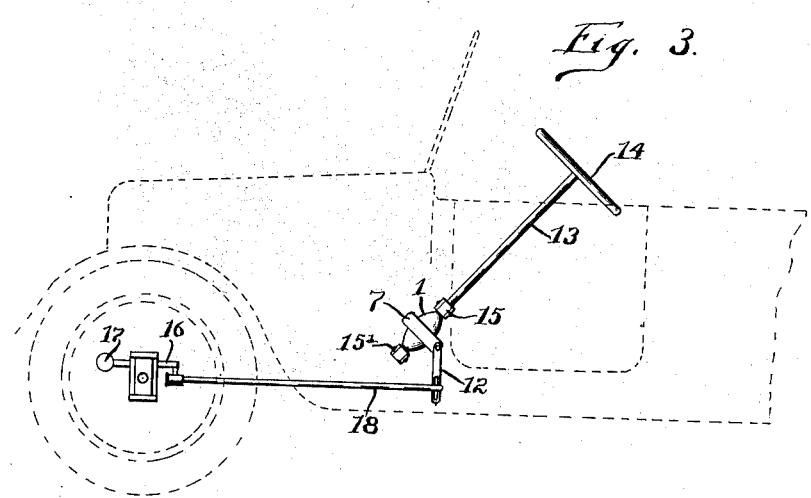
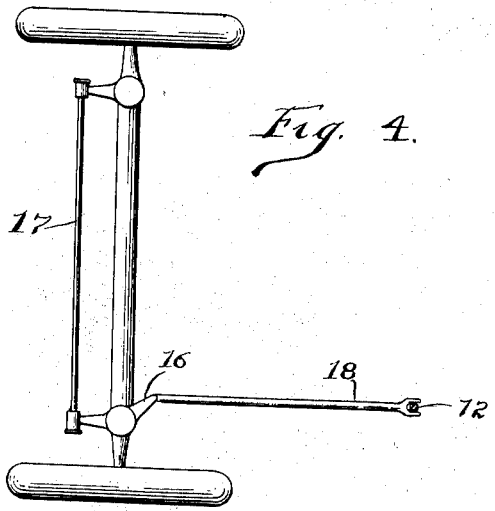
Inventor:
David C. Williams
by Geo. K. Woodworth
Atty.

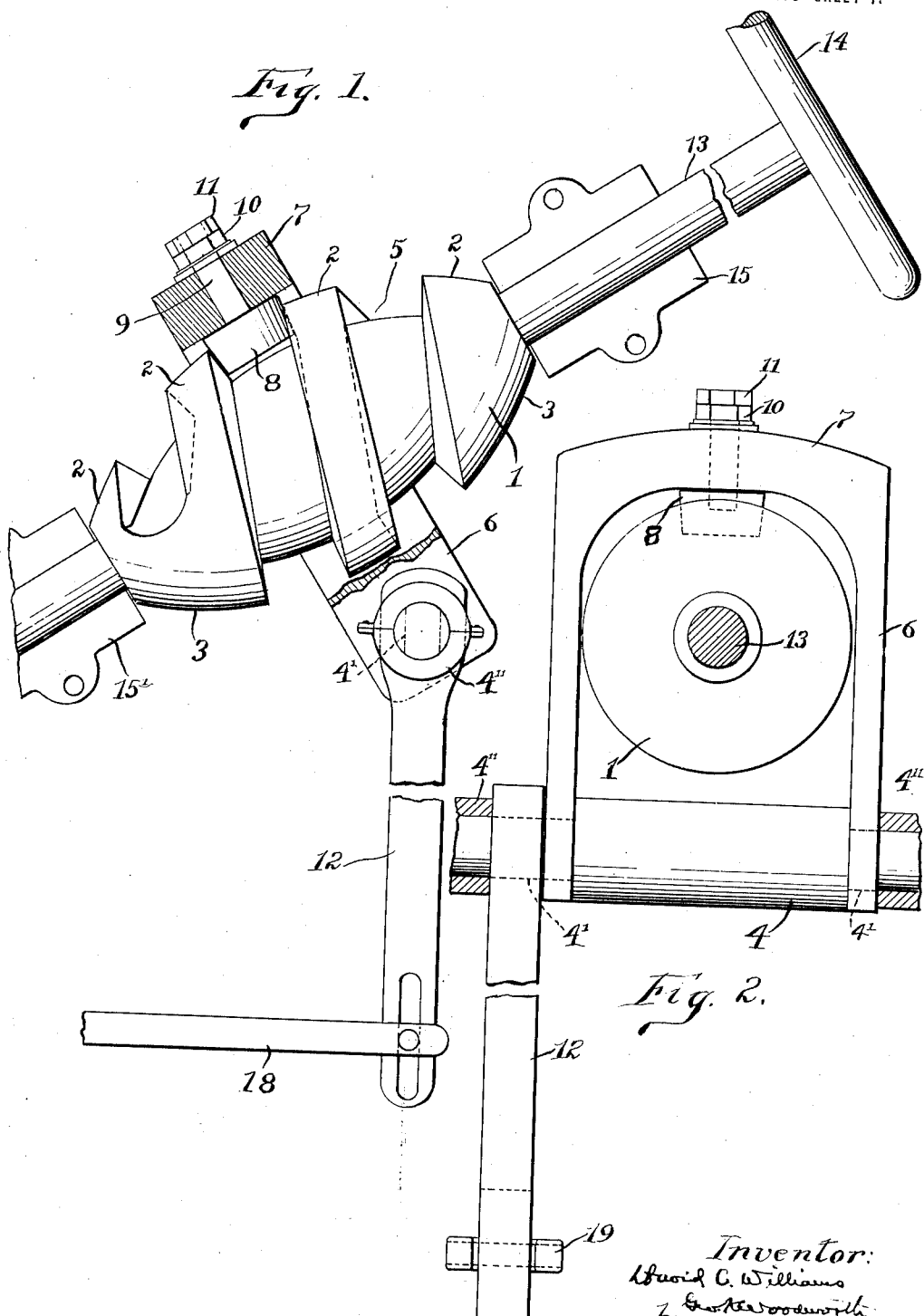

UNITED STATES PATENT OFFICE.

DAVID C. WILLIAMS, OF ARLINGTON, MASSACHUSETTS, ASSIGNOR TO RUSSELL A. BALLOU, OF BROOKLINE, MASSACHUSETTS.

MOTOR-VEHICLE STEERING-GEAR.

1,366,991.

Specification of Letters Patent. Patented Feb. 1, 1921.

Application filed April 16, 1920. Serial No. 374,368.

*To all whom it may concern:*

Be it known that I, DAVID C. WILLIAMS, a citizen of the United States, and a resident of Arlington, in the county of Middlesex and State of Massachusetts, have invented a new and useful Improvement in Motor-Vehicle Steering-Gears, of which the following is a specification.

My invention relates to means for converting rotary motion into oscillatory motion, and, although obviously for broader application, will be described in connection with the steering gear of a motor vehicle.

The object of my invention is to provide a simple and efficient device whereby rotary motion may be converted into oscillatory motion with a minimum of friction and back-lash by means of a rotatably and an oscillatably mounted member between which a true line contact is maintained at all times.

With this end in view my invention comprises as its essential features a rotatably mounted driving member having a circular transverse section and a longitudinal section bounded by the intesecting arcs of two circles of equal radius, that is to say, said driving member is a solid of revolution formed by rotating a circular arc about its chord; a driven member actuated by said driving member and mounted for oscillation about an axis normal to a meridian plane of said driving member and passing through the center of that one of the aforesaid arcs in said plane which is the more remote from said axis; and a connecting member carried by, and preferably revolubly mounted in, said driven member and coöperating with a spiral cam-groove cut into the exterior surface of said driving member. The spiral groove and connecting member are preferably so designed that the lines formed by the intersection of the meridian plane of said driving member, which is normal to the axis of said driven member, with the walls of that portion of said groove on the surface of the driving member, which is the more remote from said axis, and the lines formed by the intersection of said meridian plane with the working surface of said connecting member, are all coincident with radii of the arc formed by the intersection of said meridian plane with such surface of said driving member which is the more remote from said axis. In such case a true rolling line-contact is maintained at all times between the connecting and driven members. However, good results may be obtained even when the connecting and driven members are in frictional or slipping line-contact, such as would result from making the walls of the groove parallel instead of converging and the connecting member cylindrical instead of conical. In such case, as before, the axis of the connecting member will pass through the axis of the driven member and make an angle of ninety degrees therewith. This and various other modifications that may be made by those skilled in the art I consider to fall within the scope of my invention.

My invention will be more fully disclosed by reference to the drawings which accompany and form a part of this specification, but it will be understood that the construction therein shown may be widely varied without departing from the scope of my invention as defined by the appended claims.

In the drawings—

Figure 1 is a side view illustrating the preferred embodiment of my improvement. Fig. 2 is an end view. Figs. 3 and 4 are respectively a side view and a plan view showing the application of my invention to an automobile steering gear.

In the particular drawings selected for more fully disclosing my invention 1 represents a solid of revolution formed by rotating an arc about its chord. In the present instance the arc is shown at 2 and the chord about which it is rotated to form said solid is coincident with the axis of the steering bar 13. A transverse section of said solid of revolution is, of course, a circle as shown in Fig. 2. A meridian section of said solid of revolution will be bounded by the identical arcs 2 and 3. The center of the arc 2 in a meridian plane normal to the axle 4 is coincident with the axis of said axle.

The member 1 is provided with a spiral groove 5 and preferably the lines formed by the intersection of the meridian plane of said member, which is normal to said axis, with the walls of that portion of the groove on the surface of said member which is the more remote from said axis are coincident with radii of the arc formed by the intersection of said meridian plane with the surface of said member which is the more remote from said axis.

Straddling the member 1, which is the driving member, is a yoke 6, which constitutes the driven member, and the upper ends thereof are connected by the cross bar 7. Depending from said cross bar and preferably mounted rotatably and adjustably therein is the roller 8 which forms the connecting member between the driving member 1 and the driven member 6. In the present instance the roller 8 is mounted in the cross bar 7 by the pin 9 which is held in adjusted position by the nut 10 and lock nut 11.

The axle 4 is rigidly attached to the yoke 6, and for this purpose the said axle has flattened end portions 4' which pass through correspondingly shaped apertures in the yoke. Rigidly attached to said axle is the shifting rod 12 which in the present instance is arranged on one of the flattened end portions 4' of the axle. The outer ends of the axle are journaled in the bearings 4'' suitably attached to a fixed support.

If a meridian plane is passed through the member 1 normal to the axle 4 and through the roller 8, the lines formed by the intersection of said plane with the walls of that portion of the groove on the surface of the driving member which is the more remote from the axis of the axle 4 and the lines formed by the intersection of said plane with the peripheral surface of the roller 8 all converge to a point on the center of the axle 4. In such case a true rolling line-contact is maintained at all times between the roller 8 and its coöperative groove. However, I do not limit myself to this construction inasmuch as the roller may be in frictional contact with the driving member 1, as where the walls of the groove are parallel instead of converging and the roller 8 is cylindrical instead of conical.

Rigidly attached to the driving member 1 is the steering rod 13 to which the wheel 14 is attached, said column being supported in suitable bearings 15, 15.

As will be obvious the rotation of the driving member 1 will result in the oscillation of the yoke 6 about its axis and also in the oscillation of the shifting rod 12 about the same axis. The motion of said shifting rod may be communicated to the steering knuckles 16 which are connected by the drag link 17 in any suitable manner. In the present instance I show a rod 18 pivotally connected to the steering knuckles and attached to the shifting rod by the pin and slot connection 19.

Having thus described an illustrative embodiment of my invention without however limiting the same thereto, what I claim and desire to secure by Letters Patent is:

1. Means for converting rotary motion into oscillatory motion comprising a rotatably mounted driving member having a circular transverse section and a longitudinal section bounded by the intersecting arcs of two circles of equal radius, the surface of said driving member being provided with a spiral groove, a driven member mounted for oscillation about an axis normal to a meridian plane of said driving member and passing through the center of that one of the aforesaid arcs in said plane which is the more remote from said axis, and a connecting member carried by said driven member and coöperating with said spiral groove, said spiral groove and connecting member being so designed that the lines formed by the intersection of the meridian plane of said driving member which is normal to the axis of said driven member with the walls of that portion of said spiral groove on the surface of said driving member which is the more remote from said axis and the lines formed by the intersection of said meridian plane with the working surface of said connecting member are all co-incident with the radii of the arc formed by the intersection of said meridian plane with such surface of said driving member which is the more remote from said axis.

2. Means for converting rotary motion into oscillatory motion comprising a rotatably mounted driving member. having a circular transverse section and a longitudinal section bounded by the intersecting arcs of two circles of equal radius, the surface of said driving member being provided with a spiral groove, a driven member mounted for oscillation about an axis normal to a meridian plane of said driving member and passing through the center of that one of the aforesaid arcs in said plane which is the more remote from said axis, and a connecting member rotatably mounted in said driven member and coöperating with said spiral groove, said spiral groove and connecting member being so designed that the lines formed by the intersection of the meridian plane of said driving member which is normal to the axis of said driven member with the walls of that portion of said spiral groove on the surface of said driving member which is the more remote from said axis and the lines formed by the intersection of said meridian plane with the working surface of said connecting member are all coincident with the radii of the arc formed by the intersection of said meridian plane with such surface of said driving member which is the more remote from said axis.

3. Means for converting rotary motion into oscillatory motion comprising a rotatably mounted driving member having a circular transverse section and a longitudinal section bounded by the intersecting arcs of two circles of equal radius, the surface of said driving member being provided with a spiral groove, a driven member mounted for oscillation about an axis normal to a meridian plane of said driving member and passing through the center of that one of the aforesaid arcs in said plane which is the more remote from said axis, and a connecting member adjustably mounted in said driven member and coöperating with said spiral groove, said spiral groove and connecting member being so designed that the lines formed by the intersection of the meridian plane of said driving member which is normal to the axis of said driven member with the walls of that portion of said spiral groove on the surface of said driving member which is the more remote from said axis and the lines formed by the intersection of said meridian plane with the working surface of said connecting member are all coincident with the radii of the arc formed by the intersection of said meridian plane with such surface of said driving member which is the more remote from said axis.

4. Means for converting rotary motion into oscillatory motion comprising a rotatably mounted driving member having a circular transverse section and a longitudinal section bounded by the intersecting arcs of two circles of equal radius, the surface of said driving member being provided with a spiral groove, a driven member mounted for oscillation about an axis normal to a meridian plane of said driving member and passing through the center of that one of the aforesaid arcs in said plane which is the more remote from said axis, and a connecting member rotatably and adjustably mounted in said driven member and coöperating with said spiral groove, said spiral groove and connecting member being so designed that the lines formed by the intersection of the meridian plane of said driving member which is normal to the axis of said driven member with the walls of that portion of said spiral groove on the surface of said driving member which is the more remote from said axis and the lines formed by the intersection of said meridian plane with the working surface of said connecting member are all coincident with the radii of the arc formed by the intersection of said meridian plane with such surface of said driving member which is the more remote from said axis.

In testimony whereof I have hereunto subscribed my name.

DAVID C. WILLIAMS.